United States Patent [19]

Bauerle et al.

[11] 3,965,938
[45] June 29, 1976

[54] PIPE RESTRAINT DEVICE

[75] Inventors: Richard D. Bauerle; William A. Pitt, both of San Jose; Mervyn A. White, Campbell, all of Calif.

[73] Assignee: General Electric Company, San Jose, Calif.

[22] Filed: Nov. 11, 1974

[21] Appl. No.: 522,987

Related U.S. Application Data

[63] Continuation of Ser. No. 388,933, Aug. 16, 1973, abandoned.

[52] U.S. Cl. .............................. 138/107; 122/510; 138/103; 248/54 R; 248/60
[51] Int. Cl.² ........................................ F16L 3/04
[58] Field of Search ............... 122/11, 12, 450, 510; 110/1 A; 248/58, 60, 74 B, 54 R; 176/36, 87; 138/103, 106, 107, 178

[56] References Cited
UNITED STATES PATENTS

| 3,823,652 | 7/1974 | Lambert | 138/107 |
| 3,848,639 | 11/1974 | Chen | 138/106 |

FOREIGN PATENTS OR APPLICATIONS

| 691,215 | 5/1953 | United Kingdom | 248/60 |

Primary Examiner—Kenneth W. Sprague
Assistant Examiner—James C. Yeung
Attorney, Agent, or Firm—Ivor J. James, Jr.; Samuel E. Turner; Sam E. Laub

[57] ABSTRACT

An expendable restrain device including restraint members positioned in spaced relation around a pressure pipe to limit pipe movement in the event of pipe rupture, the restraint members being designed to undergo plastic elongation to thereby absorb the energy of the pipe.

11 Claims, 14 Drawing Figures

| RESTRAINT UNIT NO. | a | b | c | d | g | h | j | r | t | u | LOAD LBSx10³ |
|---|---|---|---|---|---|---|---|---|---|---|---|
| 1 | 4.50 | .25 | .312 | 12.75 | 5.32 | 4 | .96 | 6.655 | 17.25 | 1.00 | 31.5 |
| 2 | 6.62 | .25 | .312 | 13.81 | 5.32 | 2 | .96 | 7.715 | 18.31 | 1.00 | 15.7 |
| 3 | 10.75 | .50 | .625 | 10.25 | 9.02 | 6 | 1.74 | 10.190 | 20.38 | 2.00 | 180.0 |
| 4 | 12.75 | .50 | .625 | 11.25 | 9.02 | 4 | 1.74 | 11.190 | 21.38 | 2.00 | 120.0 |
| 5 | 20.00 | 1.00 | 1.250 | 11.25 | 14.17 | 2 | 3.36 | 15.625 | 25.00 | 4.00 | 226.0 |
| 6 | 22.00 | 1.00 | 1.250 | 12.25 | 14.17 | 4 | 3.36 | 16.625 | 26.00 | 4.00 | 452.0 |
| 7 | 24.00 | 1.00 | 1.250 | 13.25 | 14.17 | 6 | 3.36 | 17.625 | 27.00 | 4.00 | 678.0 |
| 8 | 26.00 | 1.00 | 1.250 | 14.25 | 14.17 | 4 | 3.36 | 18.625 | 28.00 | 4.00 | 452.0 |
| 9 | 28.00 | 1.00 | 1.250 | 15.25 | 14.17 | 6 | 3.36 | 19.625 | 29.00 | 4.00 | 678.0 |

PIPE RESTRAINT DEVICE

This is a continuation of application Ser. No. 388,933, filed Aug. 16, 1973, now abandoned.

BACKGROUND

There are many systems which contain pipes carrying fluids at high pressure. In known steam-electric power plants, for example, water is circulated through a heat exchanger, such as a nuclear reactor core, situated in a pressure vessel, the pressure vessel being surrounded by a primary safety containment. Steam thus produced is taken from the pressure vessel through steam pipes (or lines) and applied to a steam turbine-generator often located somewhat remote from the pressure vessel. There are, of course, numerous other pressure pipes connected to the pressure vessel and located within the primary containment, such as coolant circulation pipes, and in the case of a nuclear steam generator, pipes for applying emergency coolant to the nuclear reactor core. The primary containment also contains other vital equipment such as sensing and measuring devices and electrical circuits connected thereto.

In the unlikely event that one of the pressure pipes should rupture or break, the large jet (or blowdown thrust) forces of the escaping high-pressure fluid may cause the pipe to whip, that is, to move in a direction which is at an angle to the original longitudinal axis of the pipe. If unrestrained, such a whipping pipe may strike other components, such as the containment, other pipes, instrumentation, electrical cables and the like, thus compounding the damage to the system.

It is therefore desirable to provide pipe restraint means which will limit the movement of a severed pipe and prevent impact damage to adjacent components. Desirably, such pipe restraint means should include the following features:

1. It should absorb the energy of the moving pipe, have high energy absorption capacity and high material efficiency;
2. It should provide a relatively large normal clearance between the restraint member and the pipe to allow normal unrestricted thermal pipe movement, to facilitate in-service pipe inspection and to allow use of standard pipe insulation material;
3. It should be of compact size because space in the primary containment is severely limited;
4. It should prevent localized restraint forces on the pipe to prevent premature pipe crushing and possible break-off whereby a broken-off end of a pipe could become a missile;
5. It should be readily removable for replacement or for pipe repairs;
6. It should minimize loading on the structure to which the pipe restraint is attached;
7. It should minimize pipe rebound; and
8. It should provide predictable energy absorption and load deflection behavior.

Previously considered pipe restraint means do not provide these desirable features. For example, rigid or elastic restraints are of large size, they interfer with normal pipe movements; they can cause pipe rebound and impose high loads on the pipe and restraint attachment structure. Another previous design involved the use of a relatively large amount of crushable material around the pipe. In addition to its excessive space requirements, this design interfers with pipe inspection and repairs. The present invention is, of course, distinct from pipe hangers (saddles or cradles) such as shown, for example, in U.S. Pat. Nos. 2,291,148; 3,623,686; 3,539,136 and the like. Such hangers are in contact with the pipe since their purpose is to support the pipe in normal operation. They are not designed to be normally out of contact with the pipe nor to absorb the pipe whip energy of a ruptured or broken pipe.

SUMMARY

An object of this invention is to provide a pipe restraint device having the desirable features set forth hereinbefore.

This and other objects are achieved by a pipe restraint unit comprising U-shaped restraint bars (or members) surrounding the pipe in spaced relation thereto. The ends of the restraint bars are secured to a structural member by pivotable connections, such as by lugs and clevises. A C-shaped, malleable bearing plate is carried by each restraint bar to distribute the load and minimize local crushing of the pipe. The material and the size of the restraint bars are selected, in relation to the postulated pipe whip load, to provide plastic elongation of the restraint bars and absorption of the energy of the whipping pipe. Additionally, the bearing plates are designed to wrap around the pipe to minimize rebound.

DRAWING

The invention is described more specifically hereinafter with reference to the accompanying drawing wherein.

DESCRIPTION

Figure 1:
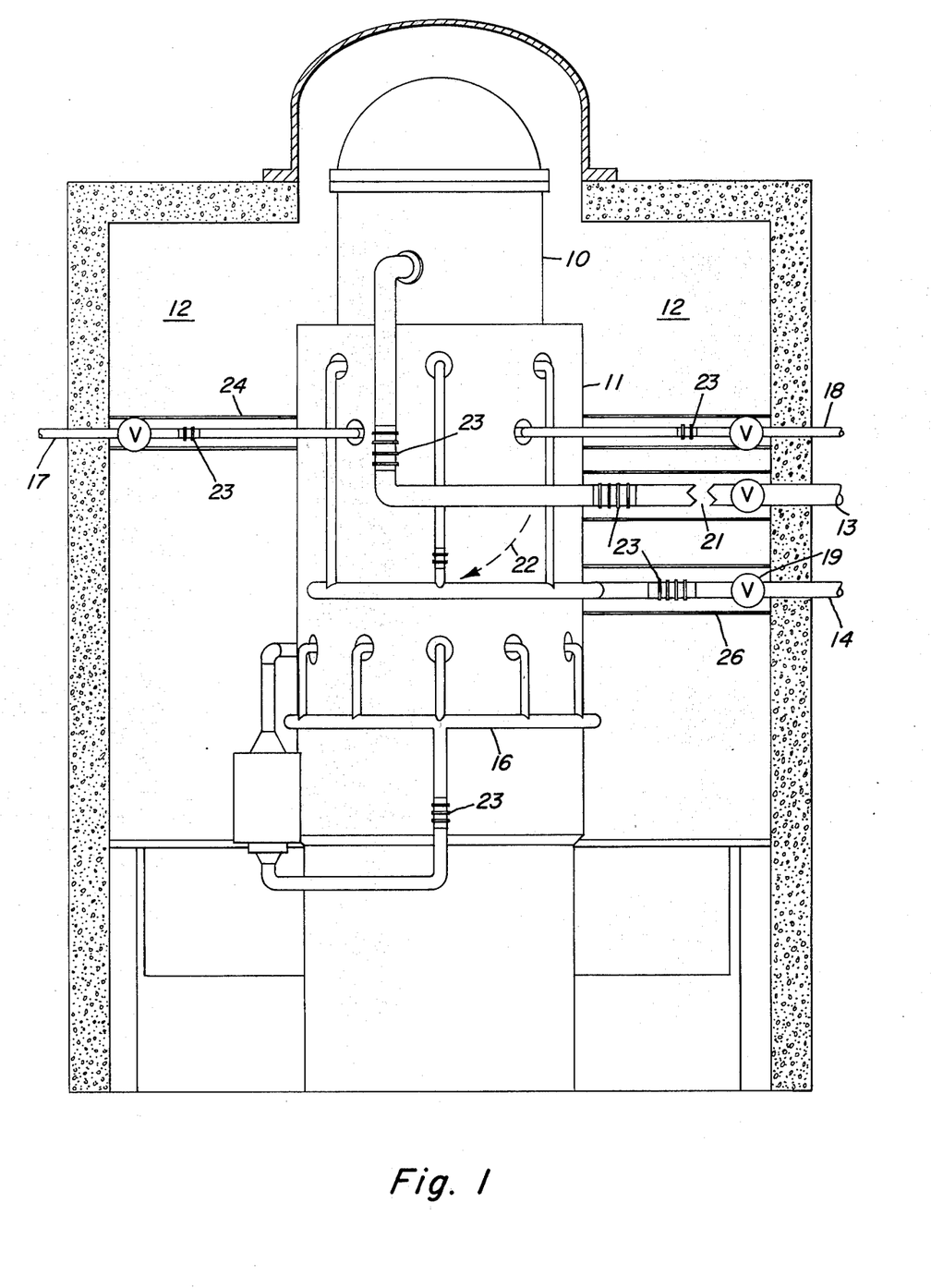
FIG. 1 is an elevation view of a steam generator containment including a system of pressure pipes.

As an example use of the present invention a steam supply system is illustrated in simplified, partly schematic form in FIG. 1. Such a system includes a steel pressure vessel 10 containing, for example, a nuclear reactor core. The pressure vessel 10 is surrounded by a shield wall 11 formed, for example, of reinforced concrete. The pressure vessel 10 and shield wall 11 are, in turn, contained within a sealable compartment (or containment) 12.

There are many pressure pipes connected to the pressure vessel 10 which are thus located within or traverse the containment 12. Examples of such pipes, as illustrated in FIG. 1, include a mainsteam pipe 13, a feedwater pipe 14, a coolant circulation piping system 16 and emergency coolant pipes 17 and 18. (Lines which penetrate the walls of the containment 12 include isolation valves such as a valve 19 in the feedwater pipe line.)

The serious consequences of unrestrained pipe whip may be appreciated by considering a hypothetical break or severance of the main stream line 13 at, for example, a location indicated as 21. If the pipe is unrestrained, the high pressure issuing from such a break would likely cause the portion of the pipe 13 to the left (in FIG. 1) of the break 21 to whip in an arcuate path indicated generally by the curved, dashed arrow 22. Such a whipping pipe obviously endangers other piping and other system components in the compartment 12. To avoid such pipe movements, restraints according to the invention, are placed at strategic positions around the various pipes such as the restraint units indicated as 23 in FIG. 1. The restraint units 23 are anchored (e.g. attached) to convenient adjacent portions of the containment structure such as to the shiled wall 11, to a floor 24, to a beam 26 and the like.

Figures 2A, 2C:
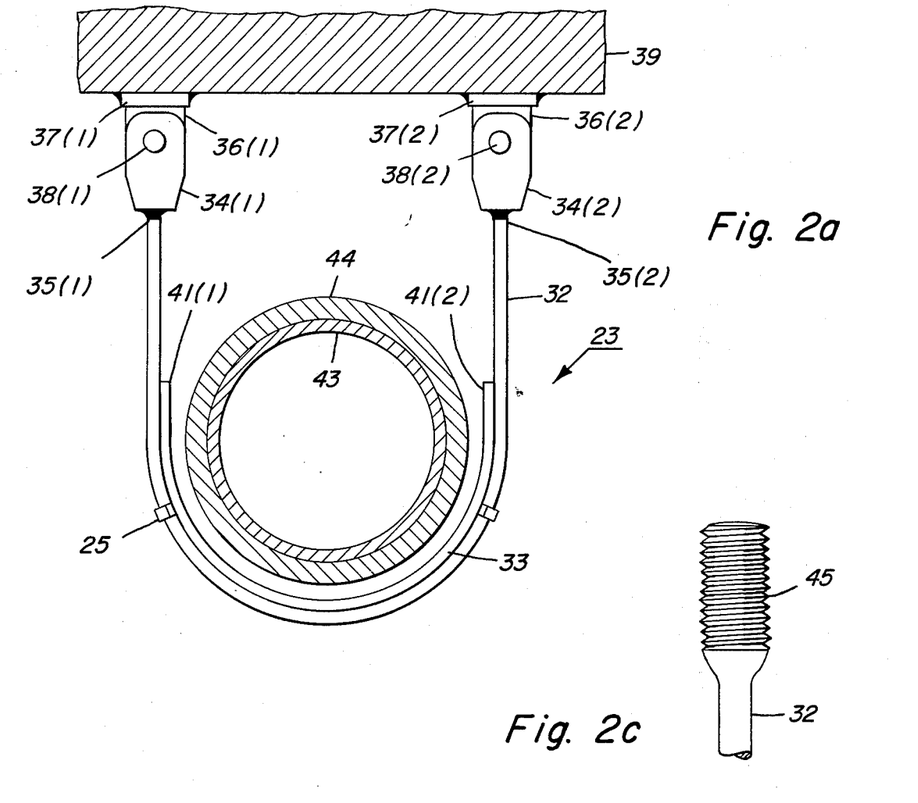
FIGS. 2a–2c illustrate a pipe restraint unit according to the invention.
Figure 2B:
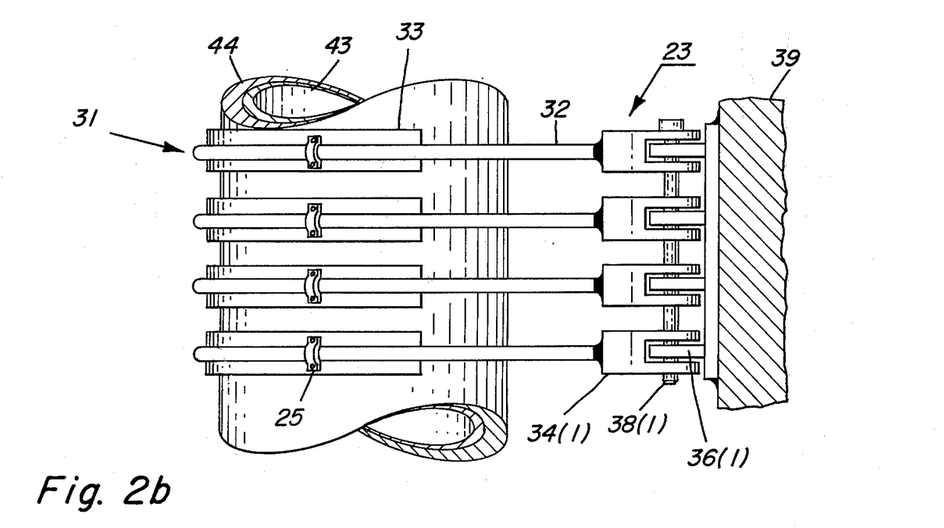

A pipe restraint unit 23 according to the invention is shown in detail in FIG. 2a–2c. The restraint unit 23 consists of one or more restraint modules 31 each comprising a U-shaped restraint bar 32, a bearing plate 33, clevises 34(1) and 34(2) attached to the ends of restraint bar 32, and a pair of lugs 36(1) and 36(2). The lugs 36(1) and 36(2) are secured (as by welding) to respective base plates 37(1) and 37(2) and are pivotally (or hingeably) attached to the clevises 34(1) and 34(2) by pins 38(1) and 38(2). The base plates 37(1) and 37(2) are secured (as by welding) to a suitable structural member 39 (such as the shield wall 11, floor 24, beam 26 (FIG. 1) or the like). The arcuate bearing plate 33 is attached to the restraint bar 32 short of its ends 41(1) and 42(2) by suitable means such as a plurality of clamps 25 welded or otherwise secured to the bearing plate 33. The U-shaped restraint bars 32, with their attached, arcuate bearing plates 33, are positioned around the pressure pipe to be restrained (such as a steel pipe 43) in spaced relation thereto with a clearance therebetween. (The pipe 43 may be covered with normal thermal insulation indicated as 44.)

Ends 35(1) and 35(2) of restraint bar 32 may be welded to the clevises 34(1) and 34(2) as shown in FIG. 2a and 2b. Alternatively, the restraint bar 32 may be formed with enlarged threaded ends 45 as shown in FIG. 2c, the clevises 34(1) and 34(2) being found with mating female threads. These larger diameter ends 45 reduce the possibility of breakage of the restraint bars at the root of the threads.

As explained more fully hereinafter, the material of the restraint bars, the number of modules 31 and the diameter of the restraint bars are selected with respect to the energy that must be absorbed in the event of the postulated break of the pressure pipe 43.

Figure 3A:
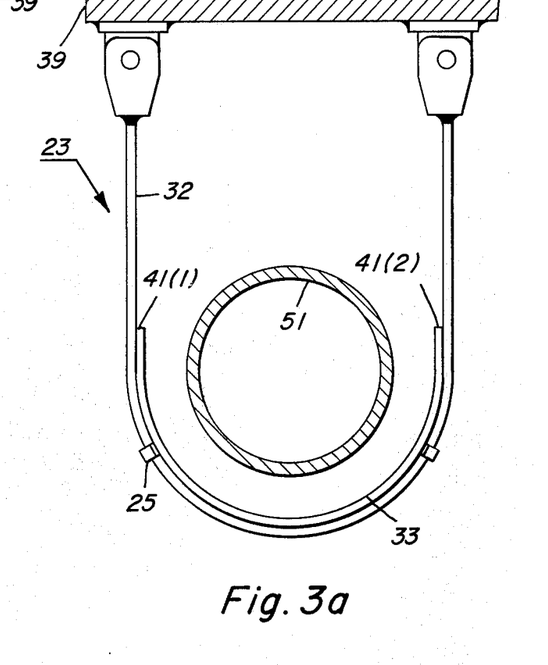
FIGS. 3a–3c illustrate action of the pipe restraint unit in absorbing the energy of a moving pipe.
Figure 3B:
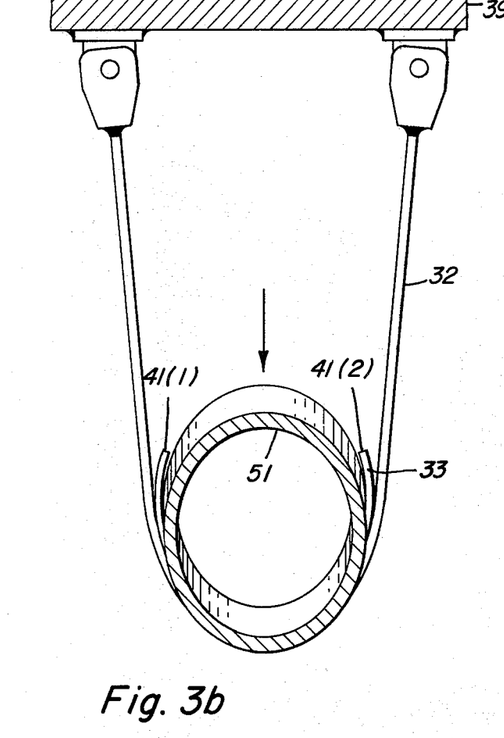
Figure 3C:
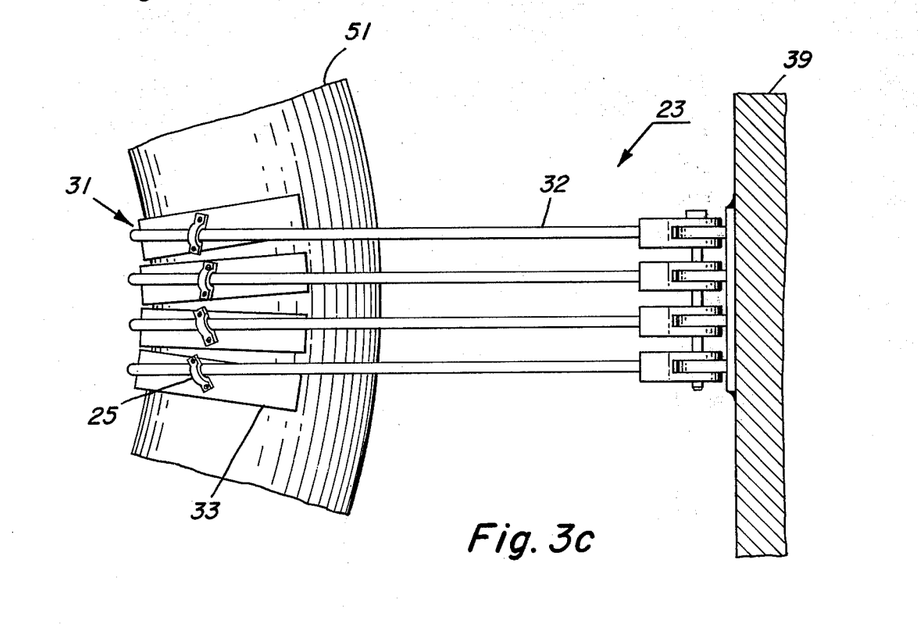

FIGS. 3a–3c illustrate action of the pipe restraint 23 in absorbing the energy of a whipping pipe 51, it being assumed that the forces are such as to move the pipe 51 downward as indicated by the arrow in FIG. 3b. The pipe 51 and the restraint unit 23 ar shown in their normal positions in FIG. 3a.

FIG. 3b is an end view after the restraint unit 23 has arrested movement of the pipe 51. The restrain bars 32 have been strained (elongated) during absorption of the pipe whip energy. The bearing plates 33 circumferentially distribute the stress and prevent total crushing of the pipe although the pipe assumes an oblong cross section shape. The bearing plates 33 bend around the partly crushed pipe and the free ends 41(1) and 41(2) tend to wrap around the pipe 51 to thus restrain the pipe from rebound.

FIG. 3c is a side view after the pipe restraint unit 23 has arrested movement of the pipe 51. The use of a plurality of pipe restraint modules 31 provides axial distribution of the pipe whip energy along the pipe 51 (as compared, for example, to use of a single heavy restrain bar). Load distribution is also provided by the independent ability of the bearing plates to conform to the surface of the pipe 51. Also, the use of several modules 31 to form the pipe restrain unit 23 reduces the size and weight of individual parts for more convenient handling in manufacture, installation and replacement and reduces costs by the use of similar multiple elements. Furthermore, by this modular approach the energy absorption capability of a given restraint unit can be adjusted over a reasonable range merely by appropriate selection of the number of modules of which it is formed.

Action of the pipe restraint unit of the invention in arresting a ruptured pipe is illustrated more specifically with reference to FIG. 4a–4d. An outstanding advantage of the pipe restraint unit of the invention is its ability to arrest pipe motion at an angle to the normal center line 53 of the pipe 51 and pipe restraint unit 23, therefore, the general case of a pipe whip force $F_p$ at an angle $x$ to the center line 53 is described.

Figures 4A, 4B, 4C, 4D:
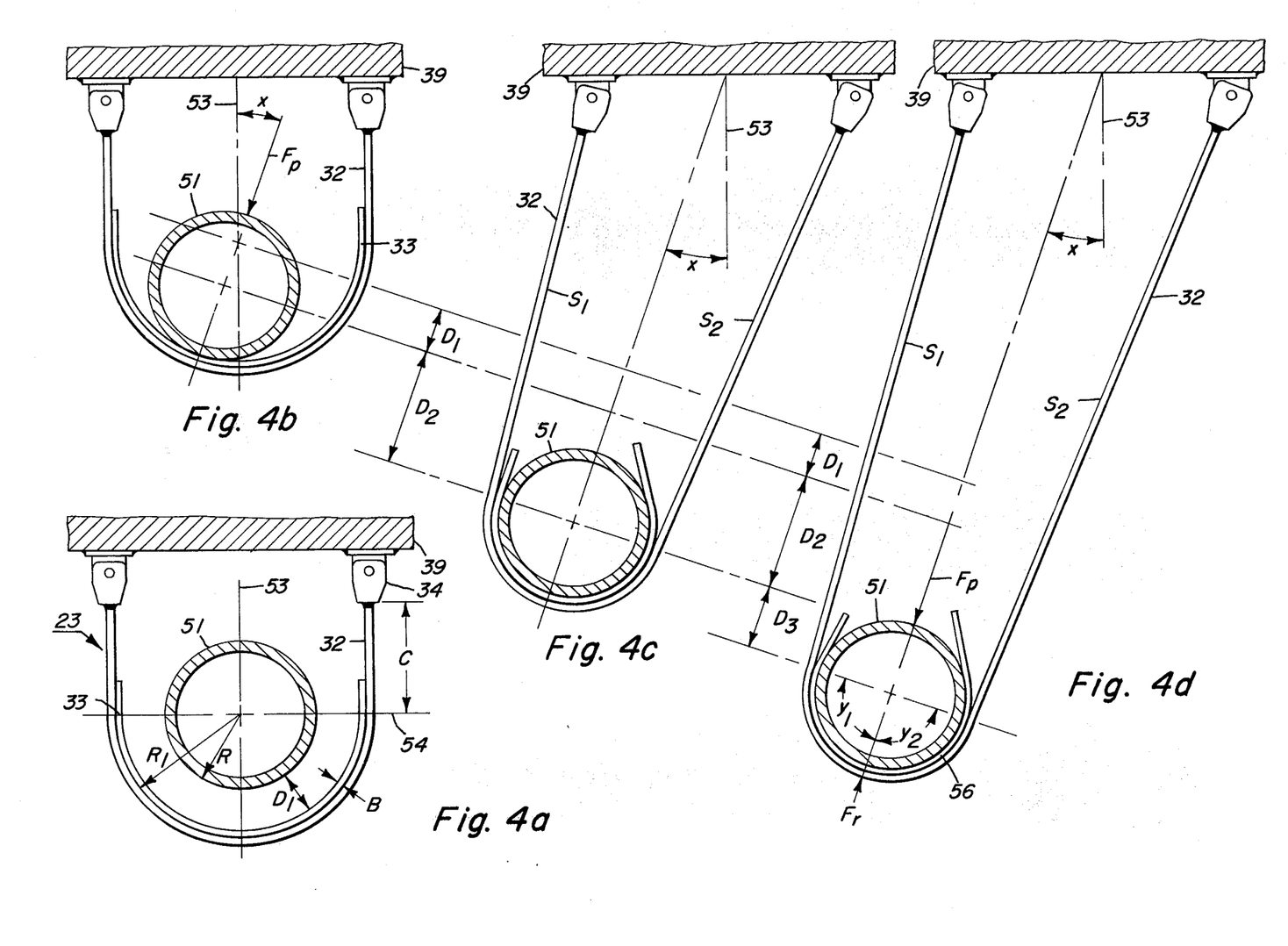
FIGS. 4a–4d illustrate the general case of the action of the pipe restraint unit of the invention in arresting a moving pipe.

FIG. 4a illustrates the normal positions of the restraint unit 23 and the pipe 51. $D_1$ is the initial clearance between the pipe and the bearing plate 33. B is the thickness of the bearing plate 33 and C is the length of the restraint bar 32 between clevis 34 and a center line 54 through the longitudinal axis or center of pipe 51. R is the (outside) radius of the pipe 51 and $R_1$ is the normal radius of curvature of the restraint bar 32 measured from the longitudinal axis of the pipe 51. Thus the normal working length of the restraint bar 32 equals $\pi/2(R_1) + 2C$.

Assuming a pipe rupture which results in the instantaneous pipe thrust force $F_p$ at the angle $x$ to the center line 53, the pipe 51 moves through the initial clearance $D_1$ and contacts the bearing plate 33 as shown in FIG. 4b. Because the radius $R_1$ of the restraint bar 32 is greater than the pipe radius R, the restraint bar 32 and the bearing plate 33 must now change shape to conform to the pipe. Thus after the pipe 51 contacts the restraint unit, as shown in FIG. 4b, the pipe and the restraint unit move together over a distance $D_2$ (designated the conformance clearance) until the restraint bar 32 become taut. During this movement over the conformance clearance $D_2$ the restraint unit 23 conforms to the pipe as shown in FIG. 4c but it imposes no significant resistance to pipe movement.

Thus the pipe 51 moves through an effective clearance equal to the sum of the initial clearance $D_1$ and conformance clearance $D_2$ before the restraint unit 23 becomes effective to resist movement of the pipe and to absorb the pipe whip energy. In practice it is desirable to minimize this effective clearance to the extent practical to thereby avoid excessive build-up of the kinetic energy of the ruptured pipe.

As the restraint unit 23 is deflected beyond the effective clearance by the moving pipe, the restraint bar 32 plastically yields, through elongation or stretching, so as to absorb the pipe whip energy. The elongating restraint bar 32 thus applies a reaction force $F_r$ to the pipe 51 according to the stress-strain relationship or load deflection characteristics of the restraint member. FIG. 4d illustrates the restraint unit 23 deflected a distance $D_3$ (defined as the working deflection) beyond the effective clearance.

Analytical relationships can be developed to predict the action of the restraint unit 23 under pipe whip load. One such relationship is based on the assumption that the two sides $S_1$ and $S_2$ of the restraint bar 32 deflect the same amount ($D_3$) even though, in the general case, the two sides $S_1$ and $S_2$ are of different lengths. (A simple model of this equal-deflection relationship is two separate bars of different length pinned together with a load applied at this pinned joint.)

Thus the reaction force $F_r$ based on this equal-deflection analysis is as follows:

$$F_r = AK(D_3^n)(1/L_1^n + 1/L_2^n) \qquad 1.$$

where:
$F_r$ is the reaction force of the restraint against the pipe;
$D_3$ is the working deflection of the restraint unit;
$A$ is the cross sectional area of the restraint bar;
$L_1$ is the effective length of the short side ($S_1$) of the restraint bar;
$L_2$ is the effective length of the long side ($S_2$) of the restraint bar;
$n$ is the exponent in a stress-strain relationship (given hereinafter) for the material of the restraint bar in its plastic region; and
$K$ is the coefficient in a stress-strain relationship for the material of the restraint bar in its plastic region.

As the restraint bar 32 stretches under the pipe thrust force $F_p$ there is friction between the bearing plate 33 and a curved portion 56 of the restraint bar 32 that is in contact with the bearing plate 33. Because of this friction, the stress or tension in this curved portion 56 is reduced and, therefore, the restraint for 32 is not as effective in its absorption of energy as a member of the same length in uniform tension. In other words, the restraint bar 32 has an effective length which is less than its actual length. Thus to account for this reduction in effectiveness, the relationship (1) above includes effective length terms $L_1$ and $L_2$ for the short and long sides $S_1$ and $S_2$, respectively, of the restraint bar.

The effective lengths $L_1$ and $L_2$ may be defined in terms of the geometry and a friction coefficient $f$ as follows:

$$L_1 = \frac{C + R_1(\frac{\pi}{2} - \frac{\sin x}{\sin y_2}) - y_1(R+B) + (R+B)(\frac{n}{f})(1 - e^{\frac{-f}{n}y_1})}{(\sin y_1)^{\frac{1-n}{n}}} \qquad (2)$$

and, $$L_2 = \frac{C + R_1(\frac{\pi}{2} + \frac{\sin x}{\sin y_2}) - y_2(R+B) + (R+B)(\frac{n}{f})(1 - e^{\frac{-f}{n}y_2})}{(\sin y_2)^{\frac{1-n}{n}}} \qquad (3)$$

where:
$C$ is the length of the normal straight portion of one side of the restraint bar 32;
$R_1$ is the normal inside radius of the curved portion of the restraint bar 32;
$x$ is the angle of the pipe thrust force $F_p$ from the normal center line 53;
$y_2$ is the contact angle between the pipe 51 and the bearing plate 33 on the long side of the restraint bar;
$R$ is the outside radius of the pipe 51;
$y_1$ is the contact angle between the pipe 51 and the bearing plate 33 on the short side of the restraint bar;
$n$ is the exponent in a stress-strain relationship (given hereinafter) for the material of the restraint bar in its plastic region;
$e$ is the base of the natural system of logarithms; and
$f$ is the coefficient of friction between the restrain bar 32 and the bearing plate 33.

Tables of the coefficient of friction for various materials are found in many known handbooks. Such handbook values of $f$ (such as in the order of 0.5 between dry steel members) are found to be somewhat high for the present application. Thus for particular metals in a particular case an accurate value of $f$ is best determined through routine experimentation. For a restrain bar 32 formed of 304 stainless steel and a bearing plate 33 formed of carbon steel the coefficient of friction $f$ for the clean, unlubricated condition, is found to be about 0.2. The friction can be reduced by the use of friction-reducing coatings of materials such as graphite, polytetrafluoroethylene or the like. The coefficient $K$ and the exponent $n$, mentioned above, appear in the well-known stress stress strain relationship for the plastic region of the material:

$$S = Ks^n \qquad 4.$$

where
$S$ is the stress or force; and
$s$ is the strain or elongation.

Figure 5:
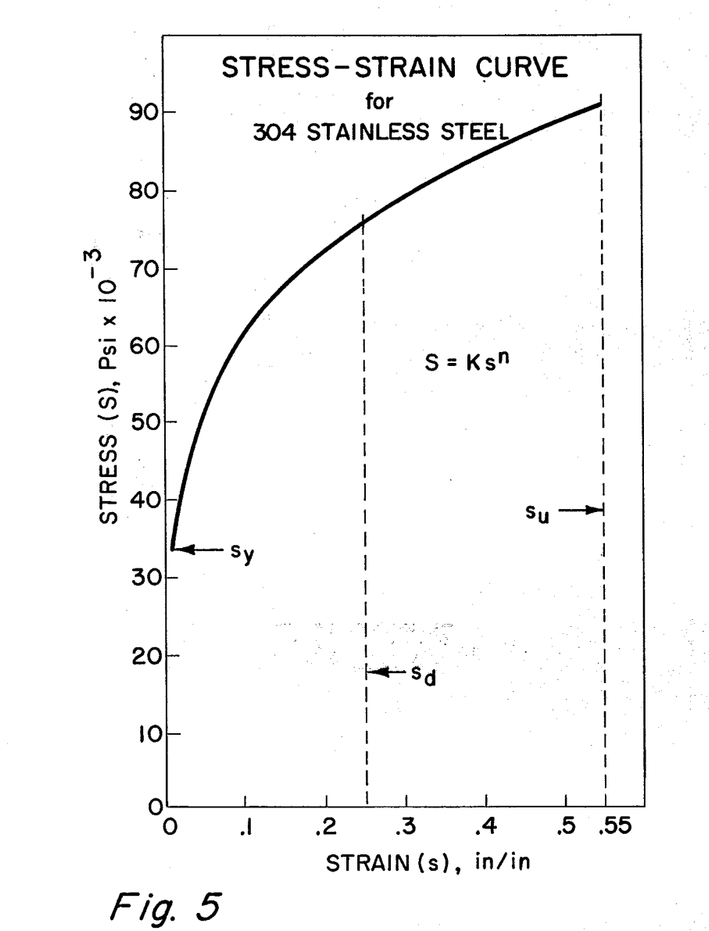
FIG. 5 is a stress-strain curve of a suitable material for restraints.

The coefficient $K$ and the exponent $n$ are best determined experimentally by a stress versus strain test of a sample of the kind of material of which the restraint bar 32 is to be formed. Such a well-known routine test provides the data from which a stress versus strain curve can be plotted. A representative stress-strain curve from tensile tests of 304 stainless steel over its plastic range is shown in FIG. 5. This curve shows the stress-strain characteristics of this material from its yield point stress $s_y$ of about 35,000 psi (pounds per square inch) to its ultimate strength or stress in the order of 90,000 psi with an elongation or strain of about 55 percent at its ultimate stress $s_u$.

The coefficient $K$ and the exponent $n$ in the foregoing relationship (5) can be determined in well-known manner by a fit to the stress-strain curve. For the stress-strain curve of 304 stainless steel shown in FIG. 5, the value of the coefficient $K$ is about 104,000 and the value of the exponent $n$ is about 0.24.

The restraint working deflection $D_3$ may be defined in terms of the stress-strain characteristics of the material as:

$$D_3 = s(L_1)(\sin y_1)(1/n) \qquad 5.$$

To provide a sufficiently conservative design limit for the working deflection $D_3$, a design value $s_d$ of the strain s is selected which is some fraction (for example, in the order of one-half) of the maximum strain $s_u$ at the ultimate stress of the particular material of the restraint bar, thus:

$$D_3 \text{ (design limit)} = s_d(L_1)(\sin y_1)(1/n). \qquad 6.$$

where
$s_d$ is the selected strain limit for the restraint bar material.

Figure 6:
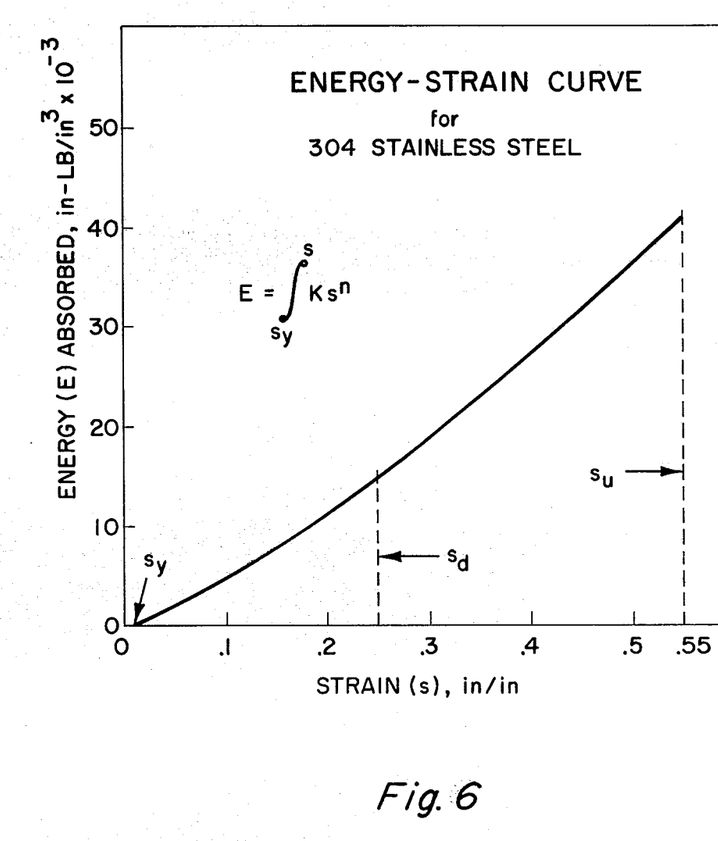
FIG. 6 is an energy-strain curve derived from the curve of FIG. 5.

The area under a stress-strain curve for a particular material (such as FIG. 5 for 304 stainless steel) from the strain $s_y$ at the yield point to the strain $s_u$ at the ultimate stress represents the energy absorbing capability of the material. This area, and hence the corresponding energy E, can be determined by integration of the stress-strain relationship. FIG. 6 is a representative energy-strain curve for 304 stainless steel derived from integration of the stress-stain curve of FIG. 5. (Stress-strain and energy-strain curves for other materials obviously can be determined in a similar manner.)

From the foregoing considerations a restraint unit according to the invention for absorbing the pipe whip energy in a particular application may be determined. The initial or normal length of the restraint bar 32 is determined by the size of the pipe 51, the distance between the pipe and the structural member 39 to which the restraint unit is anchored, and the required initial clearance $D_1$. The selection of the material and width and thickness of the bearing plate 33 is a compromise between sufficient stiffness to minimize pipe crushing and sufficient malleability to allow wraparound and conformance to the pipe.

The number of restraint modules 31, and hence restraint bars 32, in the restraint unit is selected to provide the desired longitudinal distribution of the restraint force $F_r$ on the pipe and for convenience of manufacturer and handling, a minimum of four restraint bars per restraint unit is recommended. The material from which the restraint bars 32 are formed is selected to provide high energy absorbing capacity. Of the suitable materials, 304 stainless steel is preferred. Given the restraint bar length, the number of restraint modules and thus restraint bars per restraint unit and the restraint material, the diameter of the restraint bars is determined in relation to the pipe whip energy to be absorbed by the relationships set forth above and in FIGS. 5 and 6 by, for example, assuming a "worst-case" or maximum anticipated deflection angle $x$ and limiting the strain in the short side of the restraint member to the design limit strain $s_d$. Some iteration may be necessary to arrive at a practical balance between the diameter of the restraint bars and the number of such bars in the unit. For example, if the determined diameter is undesirably large, a greater number of restraint bars can be selected.

Figure 7:
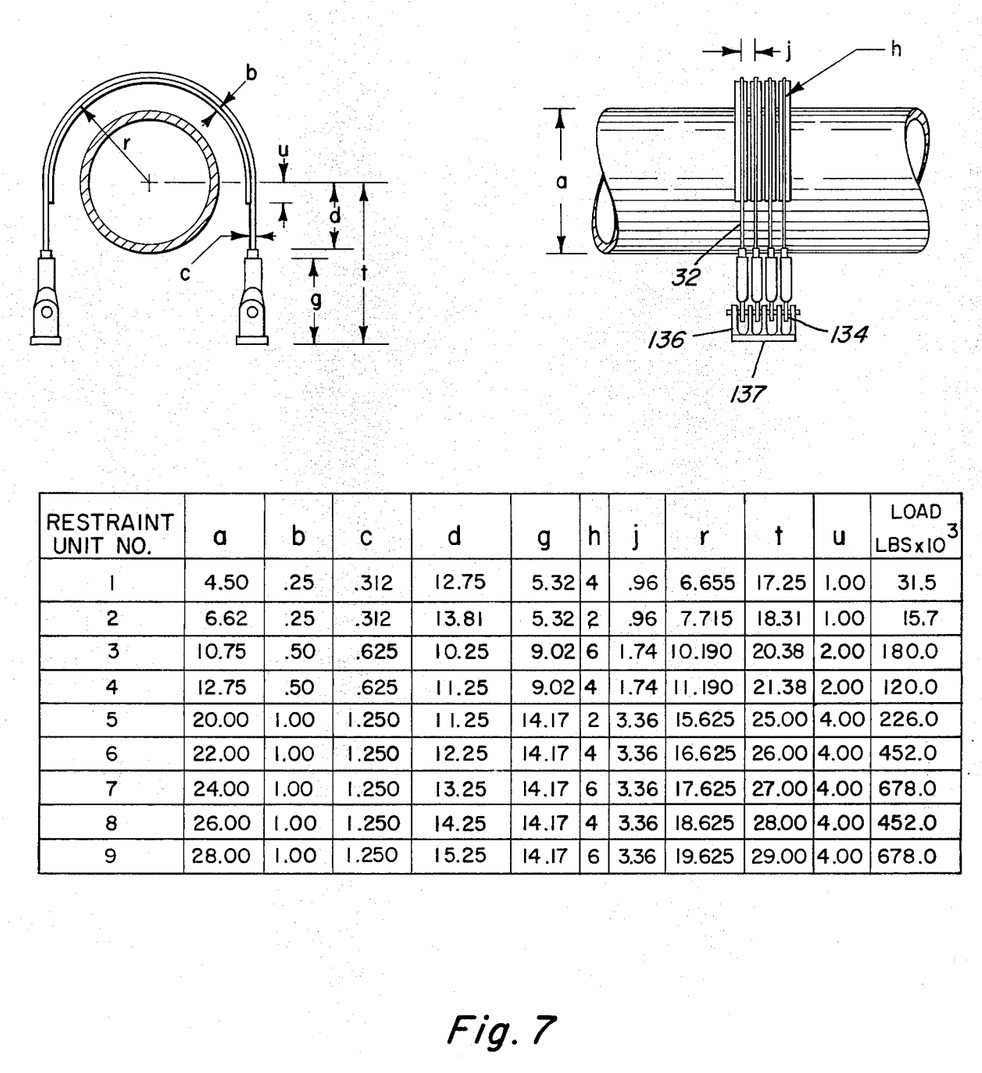
FIG. 7 is a tabulation of the dimensions of specific examples of pipe restraint units according to the invention.

Examples of a family of nine restraint units are tabulated in FIG. 7. These restraint units were designed for use with the various pipes in a nuclear reactor steam generating system with a system pressure of about 1000 psig at a temperature of about 600°F. The restraint bars are formed of 304 stainless steel. Other parts may be formed of carbon steel. The "Load" given in FIG. 7 is the maximum load capability of the restraint at the ultimate stress of the restraint bars.

FIG. 7 also illustrates an alternative pivotable connection between the restraint bars and the base plates comprising threaded lugs 134 (rather than clevises) fitted to the ends of the restraint bars 32 and positioned between lugs 136 attached to base plates 137.

What is claimed is:

1. In a system including a pipe conducting a fluid at high pressure, a restraint device normally free of any contact with said pipe for limiting movement of said pipe in the event of rupture of said pipe, comprising: a U-shaped restraint member positioned around said pipe and normally spaced therefrom; support means adjacent each end of said restraint member, said support means being fixed to a structural member of said system; and a pivotable connection between each end of said restraint member and said support means, the material and size of said restraint member being selected to provide plastic elongation of said restraint member and absorption of energy of said pipe upon impact of said pipe against said restraint member in the event of said pipe rupture.

2. The restraint device of claim 1 wherein said pivotable connection consists of a clevis arrangement.

3. The restraint device of claim 2 wherein clevis arrangement comprises clevises attached to the ends of said restraint member and lugs attached to said clevises with pins, said lugs being fixed to said support means.

4. The restraint device of claim 3 wherein said clevises are attached to said restraint member ends by threads and wherein the threaded ends of said restraint member are of enlarged diameter.

5. The restraint device of claim 1 further including a bearing plate secured to said restraint member between said restraint member and said pipe and spaced from said pipe.

6. The restraint device of claim 5 wherein said bearing plate is attached to said restraint member remote from the bearing plate ends whereby said bearing plate tends to wrap around said pipe upon being impacted by said pipe in the event of said pipe rupture.

7. In a system according to claim 1 wherein said restraint device consists of a module of a plurality of adjacently positioned restraint members, and pivotable connections between the ends of each restraint members and said support means.

8. The restraint device of claim 1 wherein said pivotable connection consists of apertured lugs attached to the ends of said restraint member, and pins through said apertures in said lugs, said pins being secured to said support means.

9. In a system including a pipe conducting a fluid at high pressure, a restraint device normally free of any contact with said pipe for limiting movement of said pipe in the event of rupture of said pipe, comprising: a generally U-shaped, normally unstressed, restraint member positioned around said pipe and normally spaced therefrom; support means adjacent each end of said restraint member, said support means being fixed to a structural member of said system; and a connection between each end of said restraint member and said support means, the material and size of said restraint member being selected to provide plastic elongation thereof and absorption of energy of said pipe upon impact of said pipe against said restraint member in the event of said pipe rupture.

10. In a system including a pipe conducting a fluid at high pressure, a restraint device normally free of any contact with said pipe for limiting movement of said pipe in the event of rupture of said pipe, comprising: a generally U-shaped, normally unstressed, restraint member including two side portions, said restraint member being positioned around said pipe and normally spaced therefrom; support means adjacent each end of said restraint member, said support means being fixed to a structural member of said system; and a connection between each end of said restraint member and said support means, the material and size of at least said side portions of said restraint member being selected to provide plastic elongation thereof and absorption of energy of said pipe upon impact of said pipe against said restraint member in the event of said pipe rupture.

11. In a system including a pipe conducting a fluid at high pressure, a restraint device, normally free of any contact with said pipe for limiting movement of said pipe in the event of rupture of said pipe, comprising: a normally unstressed restraint member having one end positioned around said pipe and normally spaced therefrom; support means adjacent the other end of said restraint member, said support means being fixed to a structural member of said system; and a connection between said other end of said restraint member and said support means, the material and size of at least a portion of said restraint member being selected to provide plastic elongation thereof and absorption of energy of said pipe upon impact of said pipe against said restraint member in the event of said pipe rupture.

* * * * *

Disclaimer and Dedication

3,965,938.—*Richard D. Bauerle*, and *William A. Pitt*, San Jose, and *Mervyn A. White*, Campbell, Calif. PIPE RESTRAINT DEVICE. Patent dated June 29, 1976. Disclaimer and Dedication filed Apr. 28, 1980, by the assignee, *General Electric Company*.

Hereby disclaims and dedicates to the Public the entire term of said patent.

[*Official Gazette, June 17, 1980.*]